United States Patent
Bonney et al.

(10) Patent No.: US 7,203,173 B2
(45) Date of Patent: Apr. 10, 2007

(54) DISTRIBUTED PACKET CAPTURE AND AGGREGATION

(75) Inventors: Jordan C. Bonney, Bloomington, MN (US); Benjamin L. Burnett, Prior Lake, MN (US); Deborah K. Charan, Minneapolis, MN (US)

(73) Assignee: Architecture Technology Corp., Eden Prairie, MN (US)

( * ) Notice: Subject to any disclaimer, the term of this patent is extended or adjusted under 35 U.S.C. 154(b) by 1149 days.

(21) Appl. No.: 10/057,576

(22) Filed: Jan. 25, 2002

(65) Prior Publication Data

US 2003/0142666 A1 Jul. 31, 2003

(51) Int. Cl.
*H04L 12/26* (2006.01)
*G06F 15/173* (2006.01)

(52) U.S. Cl. ...................... 370/242; 709/224
(58) Field of Classification Search ............... 370/240, 370/241.1, 252, 242; 709/224, 223
See application file for complete search history.

(56) References Cited

U.S. PATENT DOCUMENTS

| | | | |
|---|---|---|---|
| 4,385,384 A | | 5/1983 | Rosbury et al. |
| 5,566,161 A | | 10/1996 | Hartmann et al. |
| 5,787,253 A | * | 7/1998 | McCreery et al. ........... 709/231 |
| 5,917,808 A | | 6/1999 | Kosbab |
| 6,085,243 A | * | 7/2000 | Fletcher et al. ............. 709/224 |
| 6,108,782 A | * | 8/2000 | Fletcher et al. ............. 713/153 |
| 6,219,050 B1 | * | 4/2001 | Schaffer ...................... 715/853 |
| 6,363,384 B1 | * | 3/2002 | Cookmeyer et al. .......... 707/10 |
| 6,397,359 B1 | * | 5/2002 | Chandra et al. ............. 714/712 |
| 6,519,723 B1 | | 2/2003 | Allred et al. |
| 6,584,501 B1 | * | 6/2003 | Cartsonis et al. ........... 709/224 |
| 6,625,648 B1 | * | 9/2003 | Schwaller et al. .......... 709/224 |
| 6,810,017 B1 | * | 10/2004 | Leong et al. ................ 370/241 |
| 6,836,466 B1 | * | 12/2004 | Kant et al. ................... 370/252 |
| 2003/0023710 A1 | * | 1/2003 | Corlett et al. ............... 709/223 |
| 2003/0142670 A1 | * | 7/2003 | Gould et al. ................. 370/390 |
| 2003/0145039 A1 | * | 7/2003 | Bonney et al. ............. 709/202 |

* cited by examiner

*Primary Examiner*—Hassan Kizou
*Assistant Examiner*—Hong Sol Cho
(74) *Attorney, Agent, or Firm*—Shumaker & Sieffert, P.A.

(57) ABSTRACT

A system is described for monitoring and testing enterprise networks that tend to have a number of geographically dispersed devices and interconnected sub-networks. The system includes a plurality of distributed agents to capture packets from a network. The system further includes an aggregation module coupled to the network to receive and aggregate the captured packets. During the aggregation process, the aggregation module identifies duplicate packets that were captured by different agents as an originating packet traverses the network. A display is coupled to the aggregation module, presents the non-duplicate network packets, giving a user a clear illustration of network activity. For the duplicate packets, the aggregation module presents a representative packet, such as the originating packet, that may be expanded by the user to view the details of the duplicate packets.

30 Claims, 11 Drawing Sheets

DISTRIBUTED PACKET CAPTURE AND AGGREGATION

STATEMENT REGARDING FEDERALLY SPONSORED RESEARCH OR DEVELOPMENT

This invention was made with Government support under Contract N00178-01C-2040) awarded by the Naval Surface Warfare Center. The Government has certain rights in this invention.

TECHNICAL FIELD

The invention relates to computer networks and, more particularly, to techniques for monitoring and testing computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Dividing the data into packets has several advantages including enabling the source device to resend only those individual packets that may be lost during transmission.

The packets are communicated according to a communication protocol that defines the format of the packet. A typical packet, for example, includes a header carrying source and destination information, as well as a payload that carries the actual data. The de facto standard for communication in conventional packet-based networks, including the Internet, is the Transmission Control Protocol/Internet Protocol (TCP/IP).

A system administrator or other user often makes use of a protocol analyzer to monitor network traffic and debug network problems. In general, a protocol analyzer is a tool that captures data from a network and displays the data to the user. The protocol analyzer typically allows the user to browse the captured data, and view summary and detail information for each packet. Accordingly, the user can view the network traffic between devices on the network.

The number of devices within conventional networks has increased dramatically in recent years. A large number of enterprises, for example, have geographically dispersed operations, and typically have a local area network (LAN) supporting the information processing needs at each of these locations. These dispersed operations may be connected by leased lines or virtual private networks (VPN). Accordingly, the network traffic within an enterprise has increased in volume, as well as complexity. Furthermore, a typical enterprise network may have a number of routers and switches that provide alternate routes for traffic flow. Consequently, conventional protocol analyzers do not provide sufficient insight into traffic conditions across large networks.

SUMMARY

In general, the invention is directed to techniques for monitoring and testing a network, such as an enterprise network. The described techniques provide insight into traffic patterns within enterprise networks that tend to have a number of geographically dispersed network devices and interconnected sub-networks. The techniques may be useful in detecting network errors or other conditions.

In one embodiment, the invention is directed to a system that includes a plurality of distributed agents to capture packets from a network. The system further includes an aggregation module coupled to the network to receive and aggregate the captured packets. During the aggregation process, the aggregation module identifies duplicate packets that were captured by different agents. These duplicate packets may be captured, for example, as an original packet traverses the network. A display is coupled to the aggregation module, and presents the non-duplicate network packets, thereby giving a user a clear illustration of network activity. For the duplicate packets, the aggregation module presents a representative packet, such as the originating packet, that may be expanded by the user to view the details of the duplicate packets.

In another embodiment, the invention is directed to a method comprising capturing network packets using a plurality of distributed agents, and identifying duplicate network packets that were captured by different agents. The method further comprises displaying the non-duplicate network packets. In addition, the method may further comprise displaying a representative packet for the duplicate packets.

In another embodiment, the invention is directed to method comprising capturing network packets using a plurality of distributed agents, and communicating the captured network data to an aggregator. The method further comprises aggregating the captured network packets into sets of network packets based on source information and destination information for the network packets.

In another embodiment, the invention is directed to a medium comprising instructions to cause a processor to direct a plurality of distributed agents to capture packets from a network. The medium may further comprise instructions to cause the processor to receive the captured packets and to identify one or more sets of duplicate network packets that were captured by different agents. The medium may further comprise instructions to cause the processor to display the non-duplicate network packets, and to display a representative packet for each set of duplicate packets.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
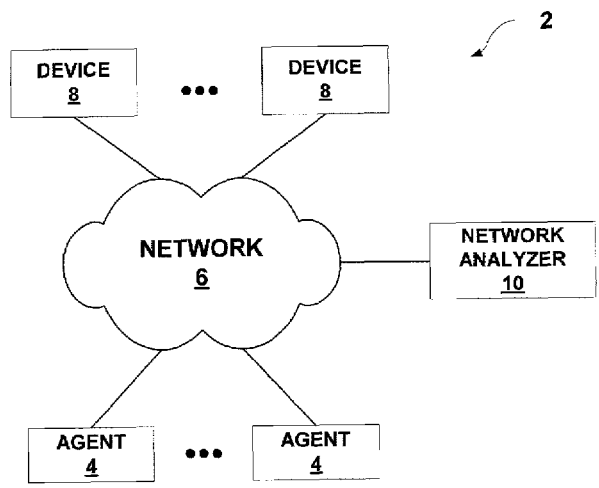
FIG. 1 is a block diagram illustrating an example network environment in which a network analyzer allows a user to monitor and test an enterprise network that may include a number of routers and geographically separate subnets.

FIG. 1 is a block diagram illustrating an example network environment 2 in which a network analyzer 10 allows a user to monitor and test a network 6. Network 6 may be a geographically dispersed network interconnecting a plurality of network devices 8. Network devices 8 represent devices capable of packet-based communication via network 6, including servers, workstations, network printers and faxes, gateways, routers, and the like.

Network analyzer 10 controls one or more agents 4 coupled to network 6 for monitoring and capturing network traffic. For example, network analyzer 10 issues commands to initiate and terminate data capture by agents 4. Upon completing the capture, agents 4 communicate the captured data to network analyzer 10, which aggregates the data to provide a complete view of traffic throughout network 6.

Agents 4 may be implemented in hardware, software, or any combination thereof. For example, agents 4 may comprise software processes that execute within dedicated computers or other hardware coupled to network 6. Agents 4 may comprise dedicated nodes coupled to network 6, as illustrated in FIG. 1, or may be installed within existing nodes of network 6, such as devices 8.

To make use of agents 4, network analyzer 10 maintains information identifying the available agents 4 throughout network 6 that can be controlled to capture network traffic. Network analyzer 10 may, for example, periodically broadcast messages to search for and identify agents 4. In addition, agents 4 may send notices when they start execution and are available for use.

Once network analyzer 10 retrieves and aggregates the data captured by agents 4, network analyzer 10 outputs a graphical display that provides a number of views of the network activity. By capturing data using one or more distributed agents 4, network analyzer 10 provides a broad view of the activity of network 6.

In addition, network analyzer 10 allows a user to create replay scenarios for testing and debugging network 6. The user can, for example, make use of the captured data and direct agents 4 to recreate the network activity by replaying the captured data, with or without modification.

Figure 2:
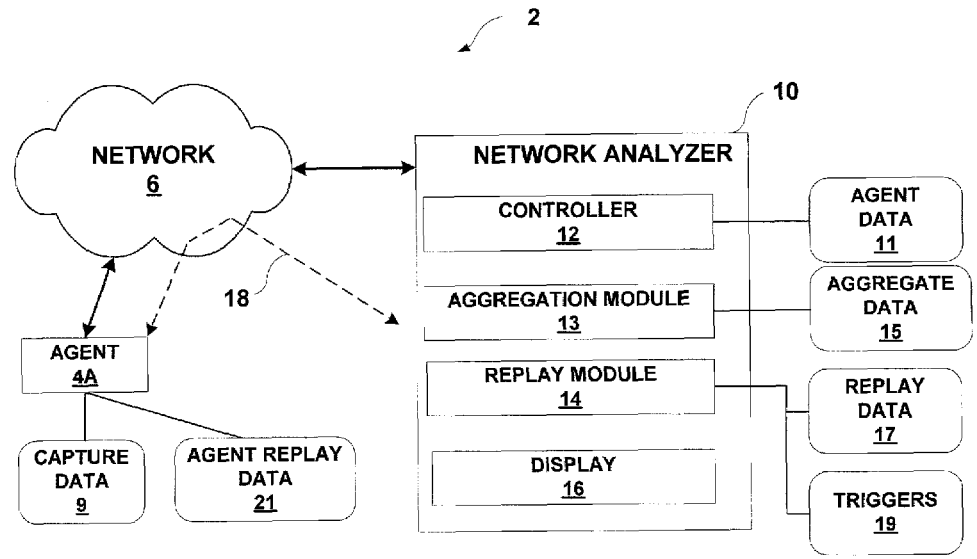
FIG. 2 is a block diagram illustrating a portion of the network environment in further detail.

FIG. 2 is a block diagram illustrating a portion of network environment 2 in further detail. Network analyzer 10 includes controller 12 that coordinates the operation of agents 4, such as agent 4A as illustrated in FIG. 2. Controller 12 communicates with agent 4A by issuing commands to, and receiving responses from, communication link 18. Communication link 18 may comprise, for example, one or more sockets maintained by controller 12 and agent 4A for communicating TCP/IP messages. Controller 12 may spawn one or more software processes or threads for communicating with individual agents 4. Controller 12 maintains agent data 11 that describes the available agents 4 within environment 2. Agent data 11 may contain, for example, Internet Protocol (IP) addresses for each agent 4 and port identifiers for communicating with agents 4.

In response to commands received from controller 12, agent 4A monitors packets on network 6, and generates capture data 9. Agent 4A may generate capture data 9 in a variety of forms, including text files, databases, and the like, and stores capture data 9 on a computer-readable medium. Upon completing the capture, agent 4A communicates the captured data to aggregation module 13 via communication link 18.

Aggregation module 13 aggregates capture data 9 from agent 4A with data captured by other agents 4 to provide a broad view of traffic throughout network 6. In particular, aggregation module 13 generates aggregate data 15, and outputs views of aggregate data 15 on display 16. For example, in one view, aggregation module 13 graphically illustrates the conversations that occurred between devices 8 (FIG. 1) during the capture. The user can select one of the conversations to further analyze the streams of packets associated with the selected conversation. In another view, aggregation module 13 graphically illustrates the physical layout of network 6 based on the captured data. The user can filter the views based on protocols, and the source and destination addresses.

By generating aggregate data 15 from capture data 9 of one or more distributed agents 4, aggregation module 13 provides a broad view of the activity of network 6. A packet communicated from a source device to a destination device, however, may be captured via a number of different agents 4 as the packet traverses network 6. In other words, different agents 4 at different points in time may capture the same packet as the packet traverses network 6. To present a clear illustration of network activity, aggregation module 13 identifies duplicate packets captured by different agents 4. More specifically, when the user views a packet stream for a particular conversation between devices 8, aggregation module 13 filters the duplicate packets, and presents the non-duplicate packets to the user. In this manner, aggregation module 13 presents the network traffic in a manner that can be more readily understood by the user.

For a packet that was captured by multiple agents 4, aggregation module 13 may present a representative of the duplicate packets, such as the earliest packet that was captured. In response to input from the user, aggregation module 13 displays the other duplicate packets, thereby allowing the user to view information describing the packet's trip across network 6. Alternatively, aggregation module 13 may display only the duplicate packets to the user to provide a clear illustration of a packet's travel across a network.

In addition to providing various views of the activity of network 6, network analyzer 10 allows a user to create complex replay scenarios for testing and debugging network 6. In particular, replay module 14 allows the user to define a replay scenario that includes one or more sets of packets captured by agents 4. The user can define settings for the replay of each set, such as alterations to be made to the packets by agents 4, the number of loops to replay the packets, trigger conditions to initiate the replay, and the like. Based on the settings, replay module 14 generates replay data 17 and associates portions of the replay data 17 with agents 4. Upon generating replay data 17, replay module 14 sends respective portions of replay data 17 to the agents 4 for storage as agent replay data 21, and starts the replay. In this manner, agents 4 introduce replay data 21 to network 6 under the direction of network analyzer 10, thereby recreating traffic patterns or other network activity.

To create sophisticated replay scenarios, replay module 14 allows the user to define triggers 19 that may be distributed to agents 4. For example, the user may define a trigger for replaying of a particular packet or set of packets of replay data 17 upon completion of a different portion of replay data 17. The user may also define triggers based on network events, such as the detection of specified network packets, the receipt of network messages or signals, and the like. Upon creation of triggers 19, replay module 14 communicates the trigger information to the appropriate agents 4.

When a trigger fires, i.e., when the requisite conditions defined by the trigger have been satisfied, agents 4 send notices to the replay module 14 via communication link 18. Upon receiving a notice, replay module 14 determines whether the notice triggers another set of packets to be replayed. If the conditions have been met, replay module 14 sends a signal directing the corresponding agent 4 to start replaying the corresponding portion of agent replay data 21. These techniques allow for advanced distributed replay and testing scenarios for network 6.

After a replay scenario has completed, aggregation module 13 retrieves from agents 4 capture data 9 that was observed during the replay. The capture data 9 can be compared to the original replay data 17 that was sent to the agents 4. Comparing a replay scenario to the capture data 9 allows a similarity computation to be made that indicates whether observed behavior of network 6 is consistent with the expected behavior based on the replay data 17.

Figure 3:
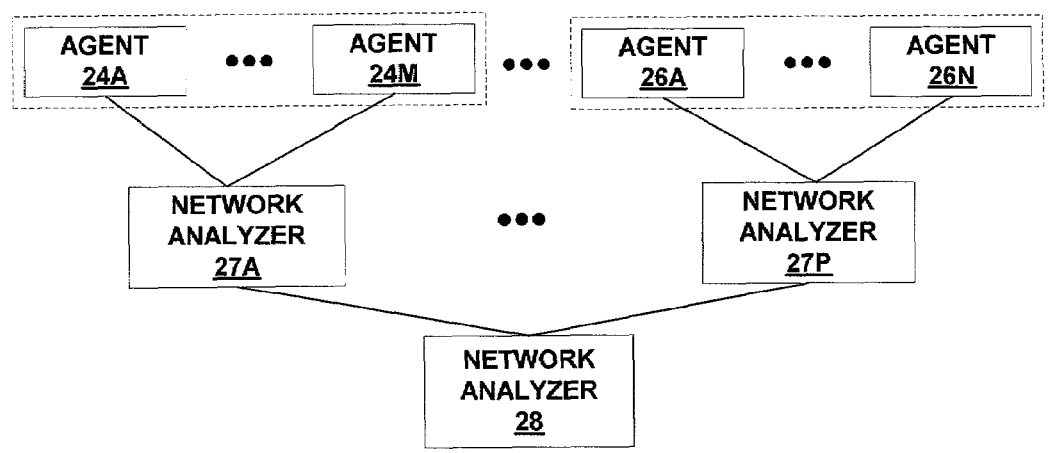
FIG. 3 is a block diagram illustrating the versatility of the network analysis and testing techniques described herein.

FIG. 3 is a block diagram illustrating the versatility of the network analysis and testing techniques described herein. In particular, network analyzers 27, 28 may be hierarchically configured. Network analyzer 27A, for example, receives and aggregates data captured by a set of agents 24A through 24M. Similarly, network analyzer 27P receives and aggregates data captured by a set of agents 26A through 26M. Network analyzer 28 provides a second level of aggregation, and receives the aggregated data from aggregation modules 27. In general, any number of network analyzers can be used, and can be coupled in any number of levels, with a root network analyzer providing a comprehensive interface to the user. In this manner, the network analyzers can be expanded to cover large enterprise networks that typically have a number of subnets. Further, by nesting the network analyzers throughout various levels of a large enterprise network a more coherent picture of network activity can be obtained.

Figure 4:
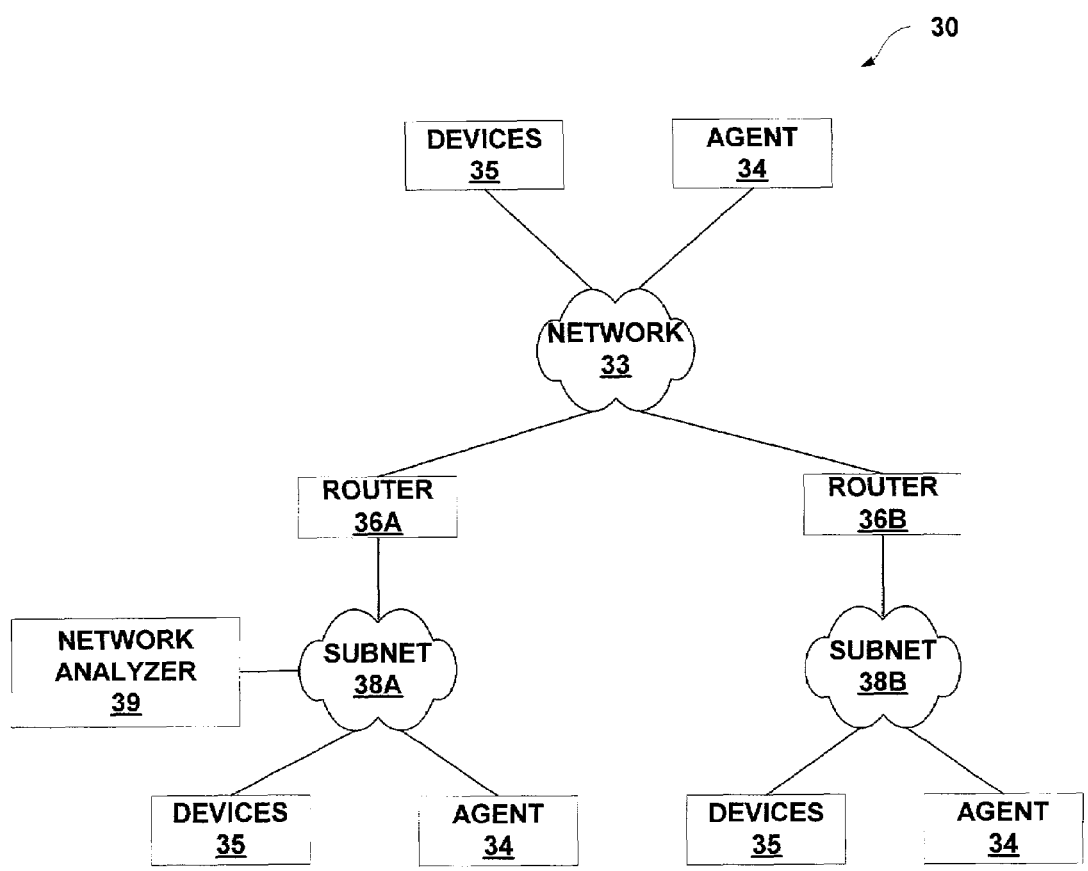
FIG. 4 is a block diagram that illustrates another example deployment of the network analyzer within an enterprise network environment.

FIG. 4 is a block diagram that illustrates an example deployment of the network analyzer 39 within an enterprise network environment 30. Environment 30 includes network 33 and two routers 36A and 36B that manage two sub-networks: subnet 38A and subnet 38B. To monitor and capture network traffic between devices 35 within the various regions of network environment 30, network analyzer 39 makes use of distributed agents 34. Notably, each subnet 38, as well as network 33, includes at least one agent 34. Accordingly, network analyzer 39 can provide a broad view of the activity of network environment 30, and can recreate traffic patterns and other network events within the various regions of network environment 30.

Figure 5:
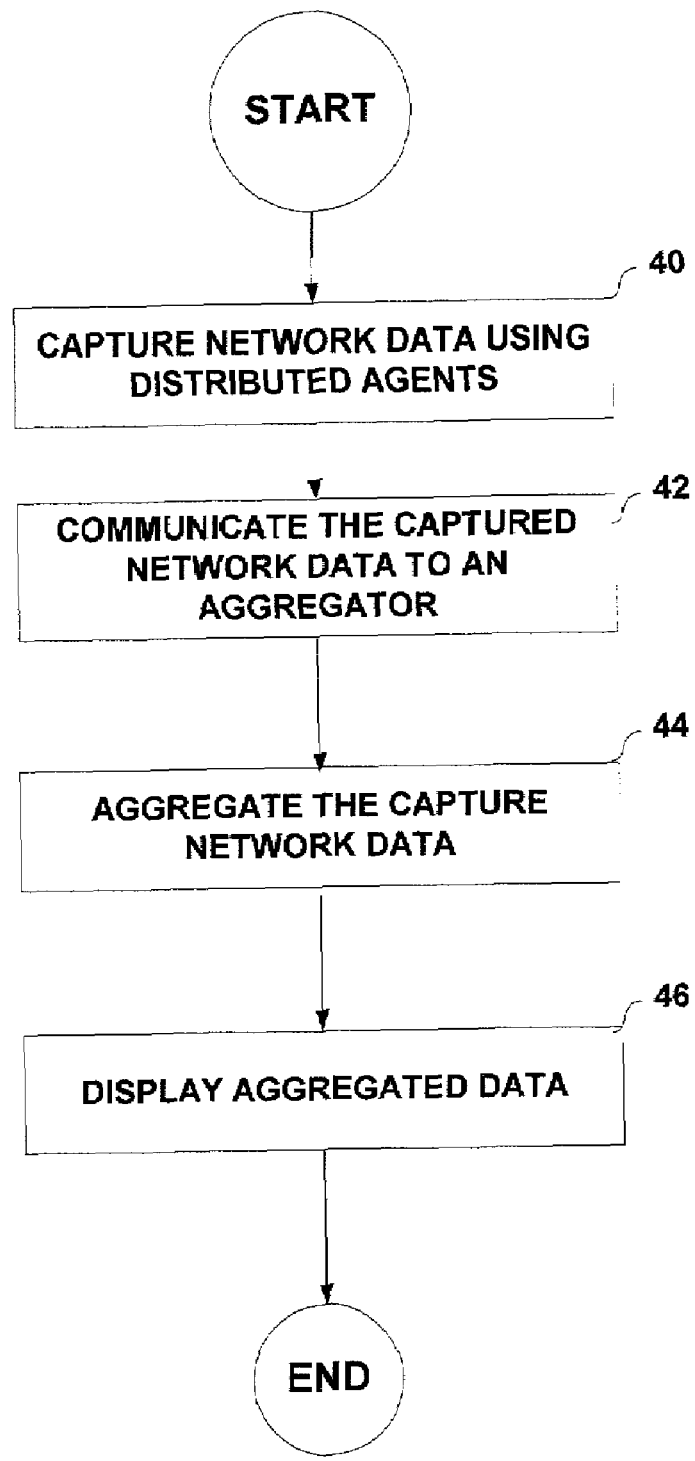
FIG. 5 is a flowchart that illustrates example operation of the network analyzer.

FIG. 5 is a flowchart that illustrates example operation of the network analyzer, such as network analyzer 10 (FIG. 1), network analyzer 27 or 28 (FIG. 3), or network analyzer 40 (FIG. 4), hereafter network analyzer 10 for simplicity. Initially, network analyzer 10 directs agents to capture network traffic (40). For example, network analyzer 10 issues commands to initiate and terminate data capture by agents 4. Upon completing the capture, agents 4 communicate the captured data to aggregation module 13 of network analyzer 10 (42), which aggregates the data to provide a complete view of traffic throughout network 6 (44). Once network analyzer 10 retrieves and aggregates the data captured by agents 4, network analyzer 10 outputs a graphical display that provides a number of views of the network activity (46).

Figure 6:
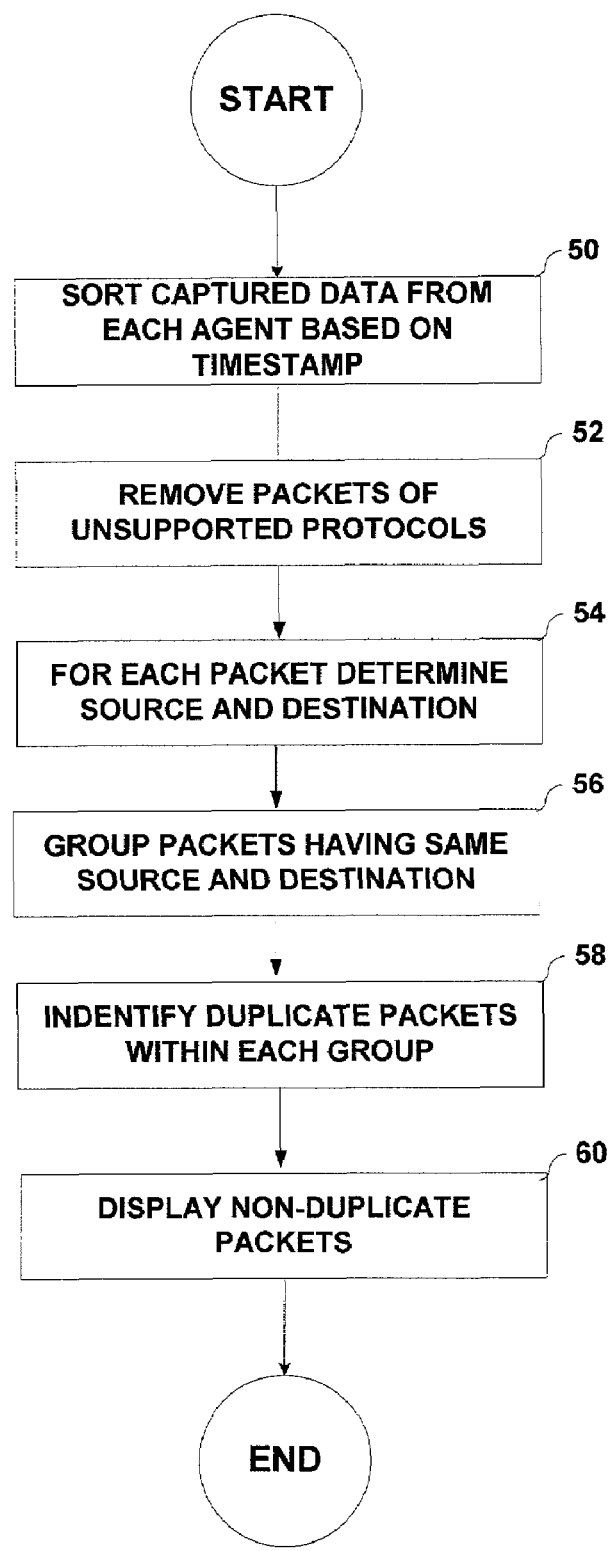
FIG. 6 is a flowchart that illustrates the operation of an aggregation module of the network analyzer.

FIG. 6 is a flowchart that further illustrates the operation of aggregation module 13 of network analyzer 10. Upon receiving capture data 9 from agents 4, aggregation module 13 sorts the capture data 9 from each agent based on an associated timestamp (50). Agents 4, for example, timestamp each packet upon capturing the packet from network 6.

Next, aggregation module 13 may filter any packets that do not conform to a supported protocol (52). For example, aggregation module 13 may filter any packet not conforming to the TCP/IP protocol.

After filtering unsupported packets, aggregation module 13 determines the source device and destination device for each packet (54). In particular, aggregation module 13 examines source information contained with each packet and determines the respective source device that originated each packet. For example, the source information may comprise a media access control (MAC) address or a Data Link Control (DLC) address for a network interface card (NIC) of the source network device. Similarly, aggregation module 13 examines destination information contained with each packet, and determines the destination device for which each packet is destined.

Next, aggregation module 13 identifies and groups packets within the captured data 9 from the agents 4 that have the same source and destination information (56). In this manner, aggregation module identifies the various conversations between devices 8 coupled to network 6.

After grouping the packets based on source and destination information, aggregation module 13 traverses each group of packets and identifies duplicate packets within each group (58). As described above, these duplicate packets are typically multiple images of the same packet captured by different agents 4 at different points in time as the packet traverses network 6. To identify the duplicate packets, aggregation module 13 first identifies network packets that use the TCP protocol and that have equal sequence numbers and acknowledgement numbers. Next, aggregation module 13 performs a comparison for payloads of the identified packets to confirm that the packets are indeed duplicates. For example, aggregation module 13 may perform a byte-by-byte comparison of the payloads. For non-TCP packets, aggregation module 13 determines the originator of the packet, and examines the payload of the packet as well as the time stamp of the packet to ascertain identify duplicate packets.

Finally, in response to a user request to view a particular conversation, aggregation module 13 displays the non-duplicate packets of the respective group of packets (60). For a packet that was captured by multiple agents 4, aggregation module 13 may present a representative one of the duplicate packets, such as the earliest or latest packet that was captured. In response to further input from the user, aggregation module 13 may display the duplicate packets, thereby allowing the user to view information describing the packet' strip across network 6. In other words, by identifying duplicate packets, aggregation module 13 may provide multiple advantages, depending on the information sought by the user of network analyzer 10. In one case, duplicate packets are removed so that only one representation of each packet is displayed in a network snapshot of packet activity. In an alternative case, identified duplicates are displayed to provide details of the displayed packet' strip across network 6.

Figure 7:
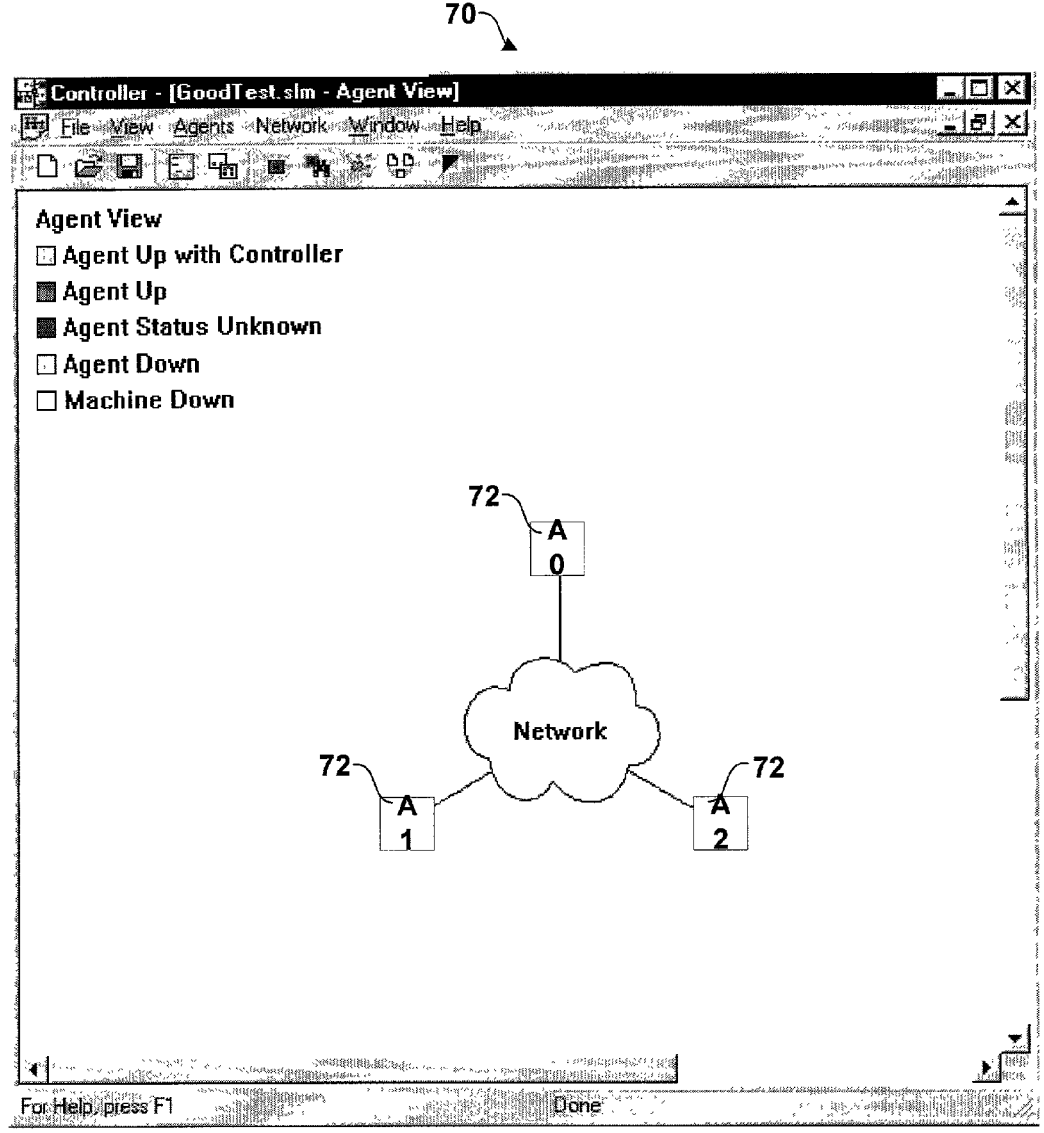
FIGS. 7–12 illustrate example user interfaces presented by the network analyzer.

FIGS. 7–12 illustrate exemplary user interfaces presented by the network analyzer 10. FIG. 7 illustrates an example user interface 70 presented by network analyzer that provides a graphical view of the network environment and the detected agents 72. Specifically, user interface 70 depicts the state of each of the detected agents 72, and whether the agents reside on the same network node as controller 12 of network analyzer 10.

Figure 8:
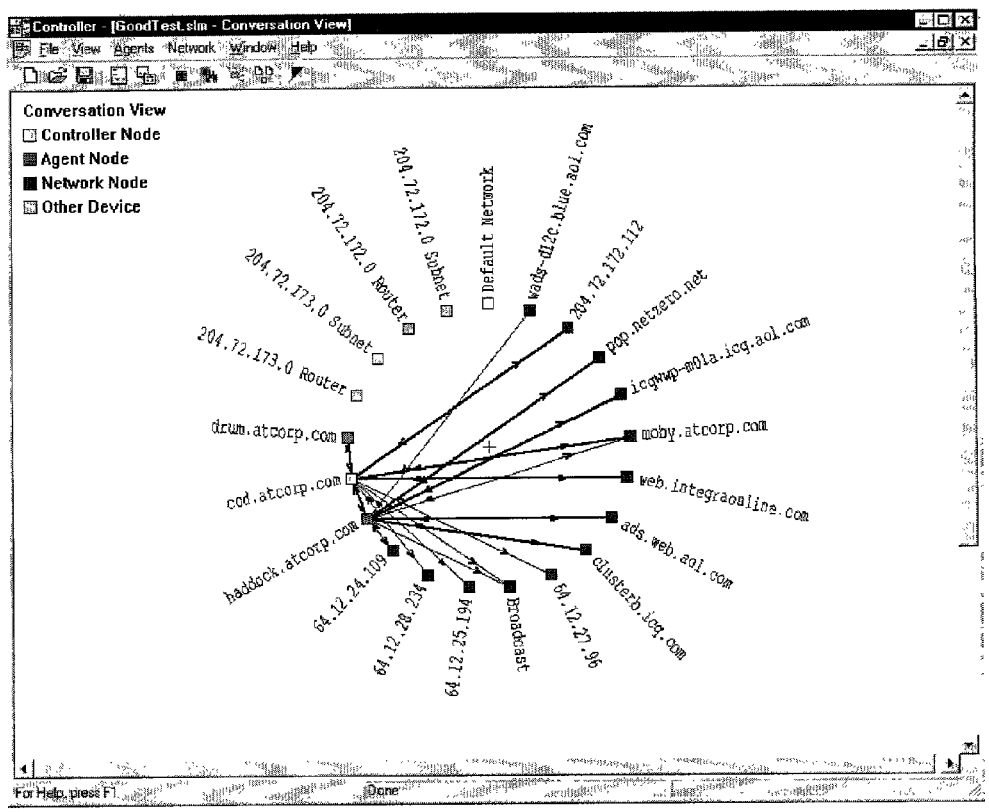

FIG. 8 illustrates an example user interface 74 presented by network analyzer 10 that provides a graphical view of the conversation present within the network. Specifically, aggregation module 13 of network analyzer 10 graphically illustrates each node, including devices, routers, and the like, that are detected based on aggregate data 15. In addition, aggregation module 13 graphically presents a communication link between each source and destination device that have associated groups of packets within the aggregate data 15.

The user may filter user interface 74 based on a variety of criteria, such as protocols, network addresses, and the like. In addition, the user can hide selected nodes from view to help reduce display clutter. For example, by holding the mouse over a conversation link, the user can direct user interface 74 to display the number of packets captured for the conversation, as well as list of protocols in the conversation. By clicking a conversation link, the user can direct network analyzer 10 to display a viewer to allow the user to drill down into the conversation.

Figure 9:
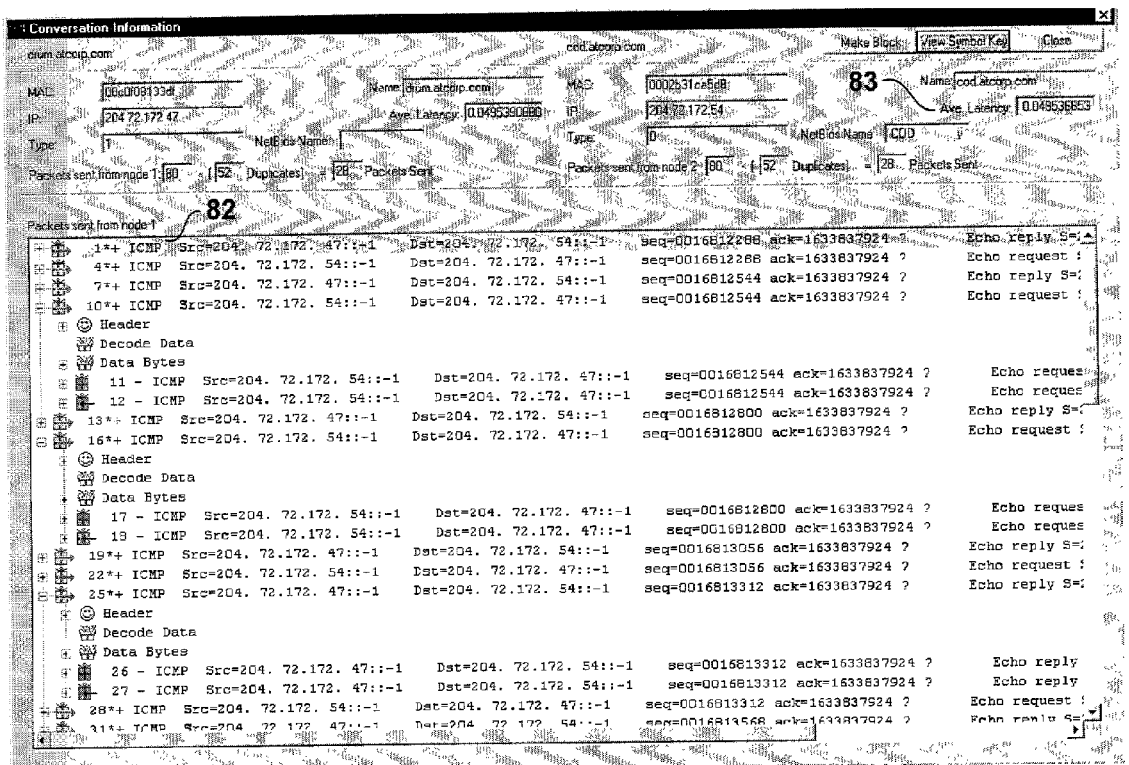

FIG. 9 illustrates an example user interface 80 presented by network analyzer 10 that presents a set of packets captured for a particular conversation. Specifically, user interface 80 provides a decode summary 82, which displays the source and destination for each packet. As described in detail above, network analyzer 10 identifies all of the duplicate packets associated with the conversation after capture data 9 has been aggregated from the agents 4. User interface 80 illustrates one example in which network analyzer 10 presents the non-duplicate packets to provide a clear view of the conversation. In particular, for each set of duplicate packets, network analyzer 10 displays a "representative" packet. In this case, network analyzer 10 determines which of the duplicate packets was transmitted earliest, and includes the packet within user interface 80.

Network analyzer 10 displays a graphical icon, i.e., the plus sign, that the user can select to expand the representative packet, causing user interface 80 to reveal the header data, decoded data, or the "raw" hexadecimal data for the duplicate packets.

Figure 10:
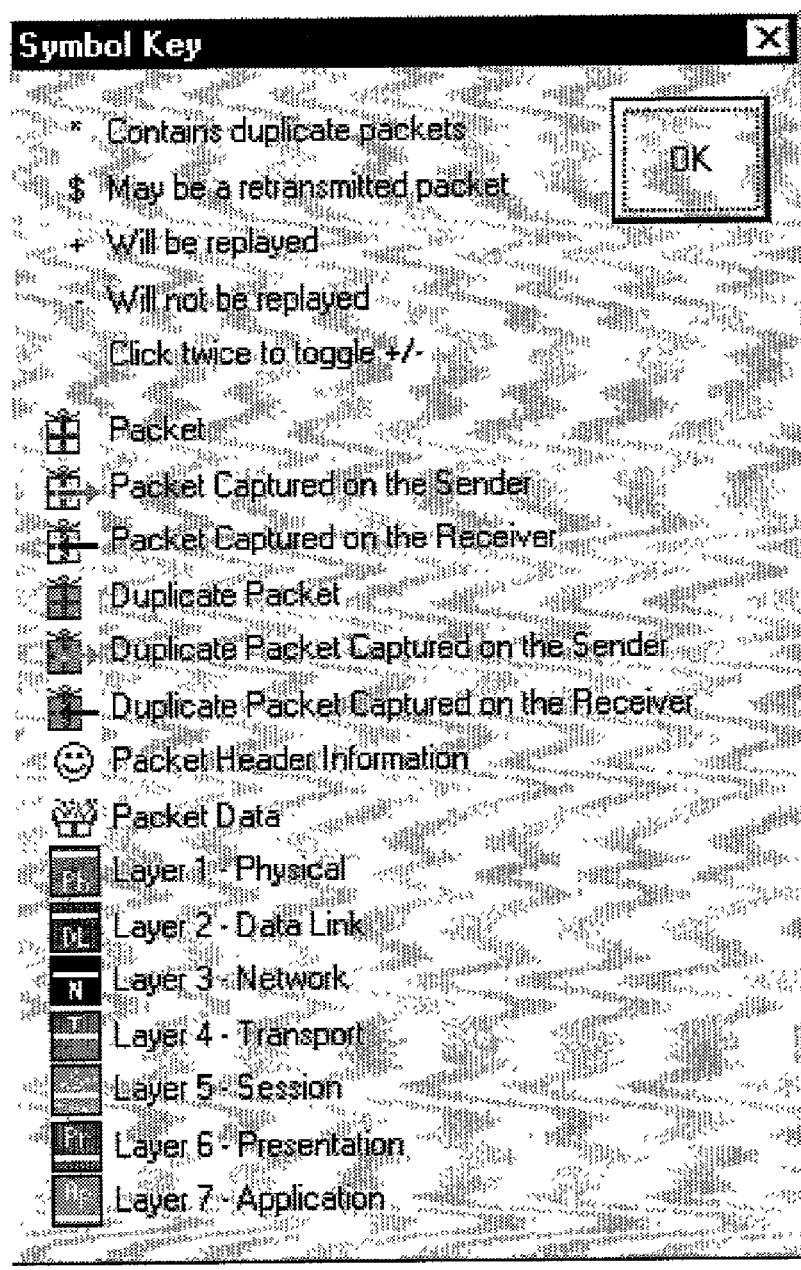

As illustrated by user interface 80, packet #10 has an icon, i.e., a package with an outgoing arrow, indicating the packet was captured on the network device that sent it. Network analyzer 10 makes this determination by comparing the source information, such as the MAC address, of the packet with the information for the agent that captured the packet. Furthermore, packet #11 is a duplicate to packet #10, and was captured on a machine that was not involved directly in the communication. Finally, user interface 80 illustrates packet #12 as having been captured on the actual destination device. By looking at the timestamps on each of these packets, and adjusting for clock differences between the devices, network analyzer 10 computes a latency 83 for the packet, and other packets, and then compute an average latency between the source and destination devices. FIG. 10 illustrates a legend 84 indicating to the user a number of graphical symbols supported by user interface 80.

Figure 11:
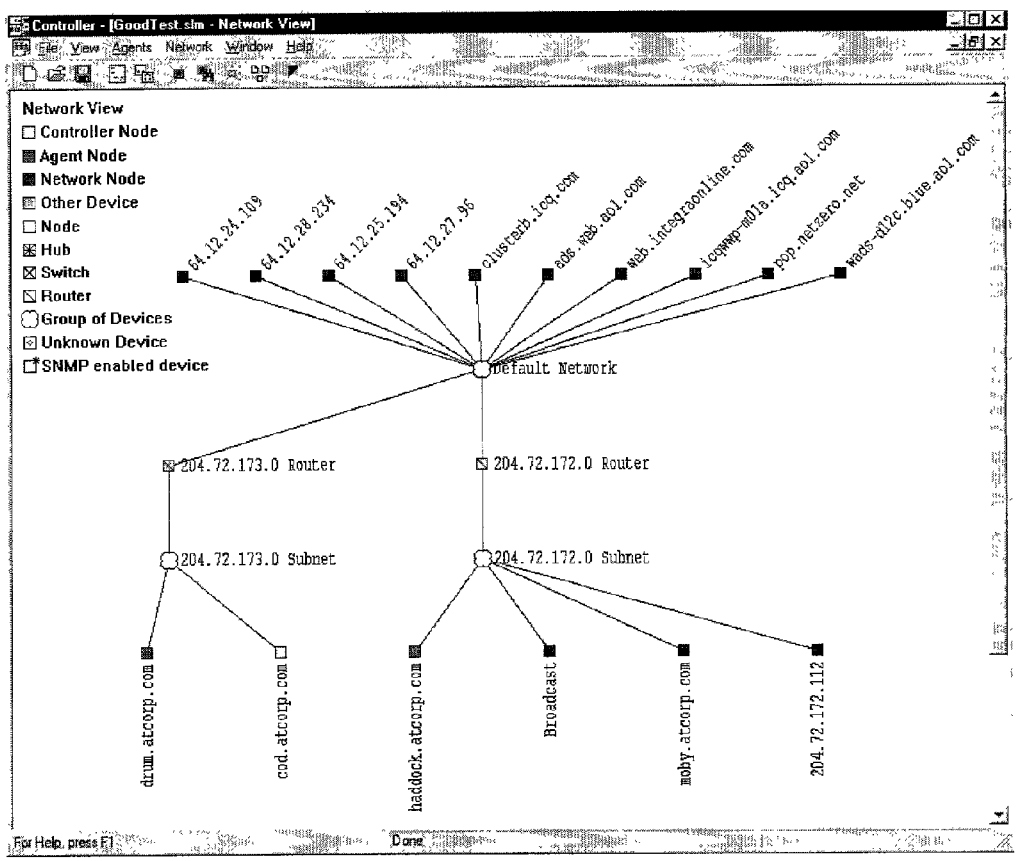

FIG. 11 illustrates an example user interface 90 presented by network analyzer 10 that illustrates the physical layout of the network. In particular, network analyzer 10 generates this view based on the captured data 9 gathered by each agent 4. For example, network analyzer 10 typically determines the interfaces and addresses for the agents 4, as well as routers that control the network or subnets of the agents 4.

Figure 12:
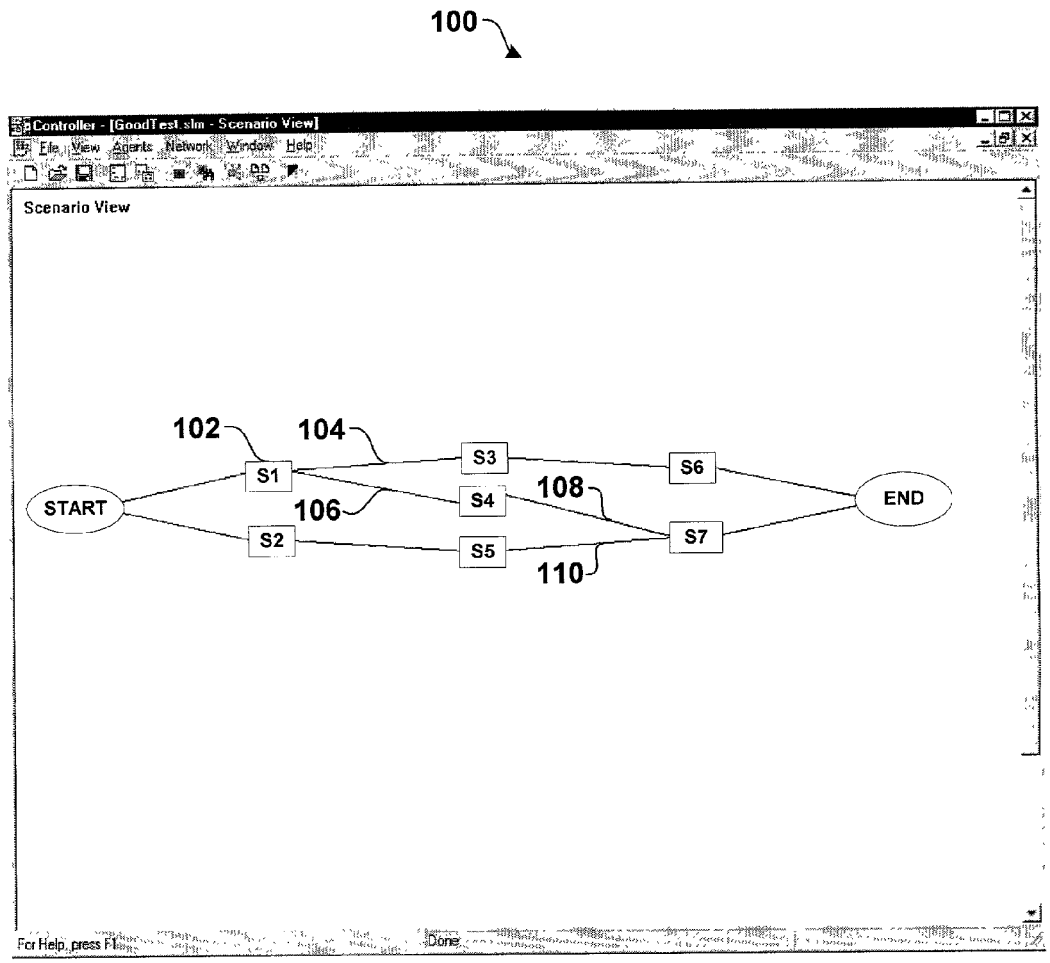

FIG. 12 illustrates an example user interface 100 presented by replay module 14 of network analyzer 10 by which the user can graphically create complex replay scenarios. More specifically, user interface 100 allows the user to create a conditional flow to control the introduction of one or more sets of network packets (S1–S7) of replay data 17. To create the sets of packets, the user can select one or more packets from aggregate data 15, and mark the selected packets for replay. In addition, the user associates each set with a respective agent 4 for introducing the set of packets to the network as directed by replay module 14. Upon selecting one of the sets S1–S7, the user can configure replay settings for the selected set such as the type of replay, alterations to make to the packets, the number of loops for the replay, and the like.

In addition, user interface 100 allows the user to define a number of triggers, illustrated as lines connecting the sets of packets S1–S7, that define a control flow for introducing the sets S1–S7. Each trigger defines one or more conditions that, if satisfied, indicate the subsequent set of packets 102 is to be replayed by the associated agent. For example, in the replay scenario illustrated by user interface 100, the completion of set S1 satisfies triggers 104 and 106, which lead to the replaying of both blocks S3 and S4. As another example, the agent 4 associated with set S7 begins introducing the network packets of set S7 when both sets S4 and S5 have completed, thereby satisfying both triggers 108 and 110, respectively.

As described above, replay module 14 of network analyzer 10 coordinates the initiation of each block based on signals received from agents 4. When a trigger fires, i.e., when the requisite conditions defined by the trigger have been satisfied, agents 4 send notices to the replay module 14 via communication link 18 (FIG. 2). Upon receiving a notice, replay module 14 determines whether the notice triggers another set of packets to be replayed. If the conditions have been met, replay module 14 sends a signal directing the corresponding agent 4 to start replaying the corresponding portion of replay data 17 that has previously been communicated to agents 4 and stored as agent replay data 21. This block/trigger architecture allows the user to create advanced replay and testing scenarios.

Various embodiments of the invention have been described. These and other embodiments are within the scope of the following claims.

The invention claimed is:

1. A method comprising:
   capturing network packets from a network using a plurality of distributed agents positioned at different locations within the network;
   communicating the network packets to an analyzer coupled to the network;
   identifying duplicate network packets that were captured by the plurality of agents at the different locations;
   displaying non-duplicate network packets based on the identification;
   comparing timestamps of the duplicate packets;
   selecting one of the duplicate packets as a representative packet based on the comparison; and
   displaying the representative packet for the duplicate packets.

2. The method of claim 1, further comprising:
   filtering the non-duplicate packets out of the captured network packets based on the identification; and
   displaying the duplicate packets based on the filtering.

3. A method comprising:
   capturing network packets from a network using a plurality of distributed agents positioned at different locations within the network;
   communicating the captured network packets to an aggregator coupled to the network; and aggregating the captured network packets into sets of network packets based on source information and destination information for the network packets, wherein aggregating the captured network packets comprises Boning the network packets based on timestamps of the network packets, assigning the network packets having equal source information and equal destination information to a common set and identifying duplicate packets within the sets of network packets that were captured by the plurality of distributed agents at the different locations.

4. The method of claim 3, further comprising displaying a subset of the network packets based on the identification.

5. The method of claim 3, wherein identifying duplicate packets comprises:
identifying network packets having equal sequence numbers and acknowledgement numbers; and
performing a byte-by-byte comparison for payloads of the identified packets.

6. The method of claim 3, wherein the source information comprises one of a media access control (MAC) address and a Data Link Control (DLC) address for a source network device.

7. The method of claim 3, wherein the destination information comprises one of a media access control (MAC) address and a Data Link Control (DLC) address for a destination network device.

8. The method of claim 3, further comprising displaying non-duplicate packets of one of the sets of network packets.

9. The method of claim 8, wherein displaying non-duplicate packets comprises displaying a representative packet for the duplicate packets.

10. The method of claim 8, wherein displaying a representative packet comprises:
comparing timestamps of the duplicate packets, and
displaying one of the packets based on the comparison.

11. A method comprising:
capturing network packets from a network using a plurality of distributed agents positioned at different locations within the network;
communicating the captured network packets to an aggregator coupled to the network;
aggregating the captured network packets into sets of network packets based on source information and destination information for the network packets;
graphically illustrating the sets of aggregated network packets;
selecting one of the sets of aggregated network packets in response to user input; and
displaying the packets of the selected set by identifying duplicate packets within the sets of network packets that were captured by the plurality of distributed agents at the different locations, and displaying non-duplicate packets of the selected set.

12. The method of claim 11, further comprising displaying a representative packet for the duplicate packets.

13. The method of claim 12, wherein displaying a representative packet comprises:
comparing timestamps of the duplicate packets, and
displaying one of the packets based on the comparison.

14. The method of claim 12, further comprising displaying a remainder of the duplicate packets not selected to be the representative packet in response to user input.

15. The method of claim 12, further comprising:
displaying an expandable graphical icon proximate the representative packet for the duplicate packets; and
displaying a remainder of the duplicate packets based on user input selecting the expandable graphical icon.

16. The method of claim 11, wherein capturing network packets comprises communicating start and stop commands from the aggregator to the agents.

17. A system comprising:
a plurality of distributed agents positioned at different locations within a network to capture packets from the network, wherein the agents assign the captured packets timestamps;
an aggregation module coupled to the network to receive the captured packets, wherein the aggregation module identifies duplicate packets that were captured by the plurality of distributed agents at the different locations, compares the timestamps of the duplicate packets, and selects one of the duplicate packets as a representative packet based on the comparison; and
a display coupled to the aggregation module, wherein the aggregation module presents non-duplicate network packets and the selected representative packet for the duplicate packets on the display.

18. The system of claim 17, wherein the aggregation module presents a remainder of the duplicate packets not selected to be the representative packet on the display in response to user input selecting the representative packet.

19. The system of claim 17, wherein the aggregation module identifies duplicate packets by identifying packets having equal sequence numbers and acknowledgement numbers, and by performing a byte-by-byte comparison for payloads of the identified packets.

20. The system of claim 17, wherein the aggregation module assigns the captured packets into sets of packets based on source information and destination information for the packets.

21. The system of claim 17, wherein the agents assign the captured packets timestamps and the aggregation module sorts the packets based on timestamps, and further wherein the aggregation module assigns the packets having equal source information and equal destination information to a common set of packets.

22. The system of claim 21, wherein the source information comprises one of a media access control (MAC) address and a Data Link Control (PLC) address for a source network device.

23. The system of claim 21, wherein the destination information comprises one of a media access control (MAC) address and a Data Link Control (DLC) address for a destination network device.

24. The system of claim 17, further comprising a controller that maintains a communication link with each of the agents, wherein the controller issues commands to the agents via the communication link to initiate and terminate data capture by the agents.

25. A computer-readable medium comprising instructions to cause a processor to:
direct a plurality of distributed agents positioned at different locations within a network to capture packets from the network;
receive the captured packets with an analyzer coupled to the network;
identify one or more sets of duplicate network packets that were captured by the plurality of agents at the different locations;
display non-duplicate network packets;
compare timestamps of the duplicate packets within each of the sets of duplicate rackets;

select one of the duplicate packets within each of the sets of duplicate packets as a representative packet of each of the sets of duplicate packets based on the comparison; and display the selected representative packet for each of the sets of duplicate packets.

26. The medium of claim 25, further comprising instructions to cause the processor to:

identify network packets having equal sequence numbers and acknowledgement numbers as duplicate packets; and perform a byte-by-byte comparison for payloads of the identified packets.

27. The medium of claim 25, further comprising instructions to cause the processor to aggregate the captured network packets into sets of network packets based on source information and destination information for the network packets.

28. The medium of claim 27, further comprising instructions to cause the processor to sort the network packets based on timestamps of the network packets, assign the network packets having equal source information and equal destination information to a common set, and identify duplicate packets within the sets of network packets that were captured by the plurality of agents at the different locations.

29. The medium of claim 27, further comprising instructions to cause the processor to graphically illustrate the sets of aggregated network packets.

30. The medium of claim 29, further comprising instructions to cause the processor to:

select one of the sets of aggregated network packets in response to user input; and display the packets of the selected set.

* * * * *

UNITED STATES PATENT AND TRADEMARK OFFICE
CERTIFICATE OF CORRECTION

| | | |
|---|---|---|
| PATENT NO. | : 7,203,173 B2 | Page 1 of 1 |
| APPLICATION NO. | : 10/057576 | |
| DATED | : April 10, 2007 | |
| INVENTOR(S) | : Bonney et al. | |

It is certified that error appears in the above-identified patent and that said Letters Patent is hereby corrected as shown below:

Figure 5, No. 44, "AGGREGATE THE CAPTURE NETWORK DATA" should read -- AGGREGATE THE CAPTURED NETWORK DATA --

Column 2, Line 25, "In another embodiment, the invention is directed to" should read -- In another embodiment, the invention is directed to a --

Column 6, Line 38, "time stamp of the packet to ascertain identify duplicate" should read -- time stamp of the packet to identify duplicate --

Column 7, Line 51, "packet, and other packets, and then compute an average" should read -- packet, and other packets, and then computes an average --

Column 9, Line 5, "prises Boning the network packets based on timestamps" should read -- prises sorting the network packets based on timestamps --

Column 10, Line 44, "and a Data Link Control (PLC) address for a source network" should read -- and a Data Link Control (DLC) address for a source network --

Signed and Sealed this

Twenty-second Day of December, 2009

David J. Kappos
*Director of the United States Patent and Trademark Office*